United States Patent [19]

Nakada

[11] 3,951,116

[45] Apr. 20, 1976

[54] MIXTURE GAS HEATING DEVICE FOR USE IN INTERNAL COMBUSTION ENGINE

[75] Inventor: Masahiko Nakada, Okazaki, Japan

[73] Assignee: Toyota Jidosha Kogyo Kabushiki Kaisha, Toyota, Japan

[22] Filed: Nov. 27, 1974

[21] Appl. No.: 527,805

[30] Foreign Application Priority Data

July 22, 1974  Japan.................................. 49-86034

[52] U.S. Cl...................... 123/122 AC; 123/122 AB
[51] Int. Cl.² .......................................... F02M 31/00
[58] Field of Search... 123/122 AC, 122 H, 122 AB; 261/145

[56] References Cited
UNITED STATES PATENTS

| | | | |
|---|---|---|---|
| 1,490,921 | 4/1924 | Godward...................... | 123/122 AC |
| 2,437,724 | 3/1948 | Brown........................... | 123/122 H |
| 3,831,568 | 8/1974 | Heimburg....................... | 123/122 H |
| 3,853,104 | 12/1974 | Nambu........................... | 123/122 AC |

Primary Examiner—Charles J. Myhre
Assistant Examiner—R. H. Lazarus
Attorney, Agent, or Firm—Stevens, Davis, Miller & Mosher

[57] ABSTRACT

A mixture gas heating device for the mixture gas to be introduced into an internal combustion engine, wherein there is provided a change-over flap valve in the vicinity of a mixture gas heating portion within a suction manifold. This change-over flap valve is adapted to switch exhaust gas passages from one to another in a manner that, when said valve is in its open position before the engine warm-up run, there is defined a gas passage, through which exhaust gases from an engine once impinge on the mixture gas heating portion of said suction manifold to be heated thereby, and then into an exhaust manifold, while there is defined another gas passage, through which exhaust gases from the engine is directly fed into the exhaust manifold, when said valve is in its closed position after the engine warm-up run.

1 Claim, 2 Drawing Figures

MIXTURE GAS HEATING DEVICE FOR USE IN INTERNAL COMBUSTION ENGINE

BACKGROUND OF THE INVENTION

1. Field of the Invention

This invention relates to a mixture gas heating device for the mixture gas to be introduced into an internal combustion engine, and more particularly to a device for heating a suction manifold by means of exhaust gases from an internal combustion engine.

2. Description of the Prior Art

In general, heating of mixture gas to be introduced into an internal combustion engine plays an important role in improvements of the fuel consumption rate as well as purification of exhaust gases. Particularly, the maintenance of the suction manifold at a suitable temperature is of consequence. More specifically, when the temperature is too low, then there may not be obtained satisfactory fuel evaporation, while too high a temperature will result in the lowered output or impaired durability of the suction manifold. In other words, control of the mixture gas heating level is of supreme importance.

In the mixture gas heating device for use in the prior art internal combustion engine, the change-over valve for use in heating mixture gas due to exhaust gases is provided within an exhaust manifold. Thus, the change-over valve is exposed to a high temperature all the times, resulting in poor durability. In other words, the change-over valve provided within the exhaust manifold is so designed as to switch the direction of exhaust gas flow from one to another depending on the warm-up condition of an engine or on the temperature condition in the suction manifold. However, since the valve stem of a change-over valve is positioned within the exhaust manifold, the valve is apt to undergo thermal strain or oxidation or corrosion, thus being plagued with difficulties in obtaining a change-over valve which gives smooth operation and sufficient durability and reliability.

SUMMARY OF THE INVENTION

It is accordingly a principal object of the present invention to provide a novel mixture gas heating device having a valve stem of an exhaust gas change-over valve positioned within a suction manifold, rather than directly in an exhaust manifold, for overcoming the aforesaid shortcomings.

According to the present invention, there is provided a mixture gas heating device for the mixture gas to be introduced into an engine, which device comprises: a suction manifold, through which a mixture gas is introduced into an engine, said suction manifold having an extension which extends outwardly thereof and communicates with an exhaust manifold in the joint portion of said extension to said exhaust manifold; a mixture gas heating portion or partition wall which separates said suction manifold from a space defined by said extension therein; a change-over flap valve positioned within said extension of said suction manifold but in the vicinity of said mixture gas heating portion said valve having a valve stem installed on said extension; a guide plate positioned in said exhaust manifold so as to guide exhaust gases onto said heating portion; whereby when said flap valve is in its open position before the engine warm-up run, the exhaust gases from the engine once impinge on the mixture gas heating portion to be heated thereby, and then into said exhaust manifold, and on the other hand, when said flap valve is in its closed position after the engine warm-up run, the exhaust gases from the engine are directly fed into said exhaust manifold.

DESCRIPTION OF THE PREFERRED EMBODIMENTS

Figure 1:
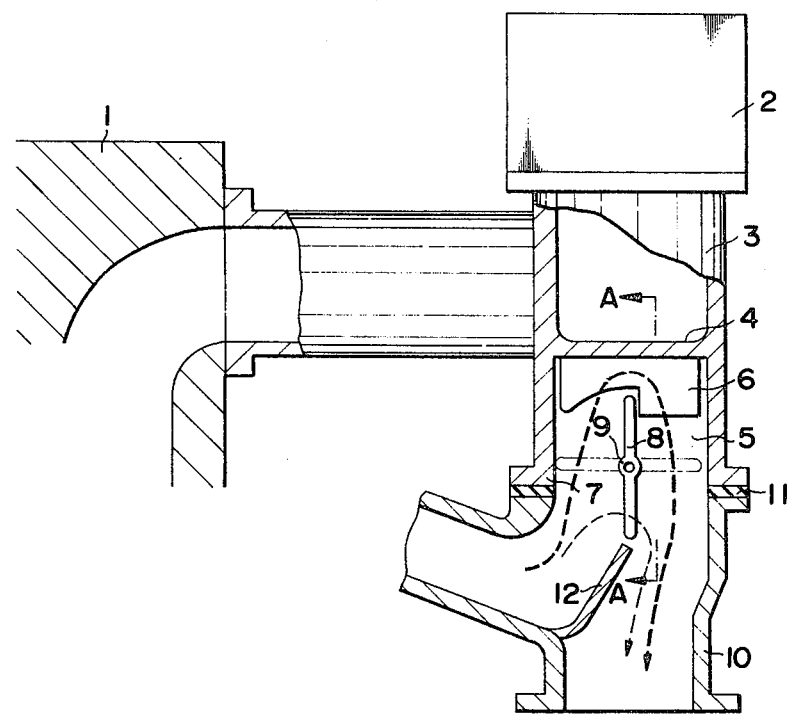
FIG. 1 is an explanatory view of partial cross-section of a mixture gas heating device according to the present invention.
Figure 2:
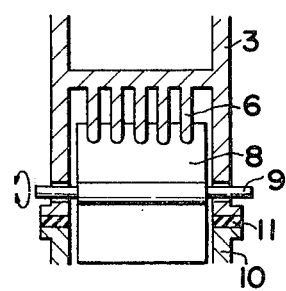
FIG. 2 is a cross-sectional view taken along the line A—A of FIG. 1.

Referring now to FIG. 1, a suction manifold 3 provided below the carburetter 2 is bounded by a heating portion or partition wall 4 which separates the suction manifold from an extension 7 thereof which will be described later. There is a heating space 5 defined by the extension 7 and bounded by the mixture gas heating portion 4. Extending downwards from the partition wall 4 within the heating space 5 is a plurality of fins 6 as shown in FIG. 2. A valve stem 9 of the change-over valve 8 is mounted in the extension 7 of the suction manifold 7 which defines the aforesaid heating space 5 therein. The valve stem 9 is driven by suitable external means (not shown).

An exhaust manifold 10 which is connected through a gasket 11 to extension 7, extends below the heating space 5. The position of the change-over flap valve 8 shown by the solid line in FIG. 1 represents a valve-open condition before the engine warm-up run, as the exhaust gas flows through the exhaust manifold in the arrow direction shown by the thick broken line to thereby impinge on and heat the heating portion 4. On the other hand, after the engine warm-up run, the flap valve 8 assumes a valve-closed position shown by the dot-dash line, by being rotated through 90° in the counter-clockwise direction after the engine warm-up run, thus blocking the flow of the exhaust gases into the heating portion, whereby the exhaust gases flow in the arrow direction shown by the thin broken line. A guide plate 12 provided in the exhaust manifold cooperates with the change-over valve in the condition before the engine warm-up run to guide the exhaust gases to the heating portion.

Because of the construction of the mixture gas heating device according to the present invention, the deterioration of a valve stem of a change-over flap valve, particularly the bearing portions thereof due to thermal strain, corrosion and oxidation is minimized, while an extended service life is insured. In addition, the change-over flap valve may be actuated smoothly, presenting a high reliability. In addition, the provision of the device according to the present invention alternatively permits the location of the drive means of the change-over flap valve in the position averted a distance from the exhaust manifold, with the result of the extremely extended durability of the drive means for use with the flap valve.

It will be understood that the above description is merely illustrative of preferred embodiments of the invention.

What is claimed is:

1. In a mixture gas heating device for use in an internal combustion engine being so constructed that a suction manifold, through which the mixture gas is introduced into the engine is heated by exhaust gases from an exhaust manifold, and the mixture gas is heated consequently, the improvement which comprises:
- an extension which is an extended portion of said suction manifold and is separated therefrom by a mixture gas heating portion or partition wall, said extension defining a heating space and communicating with said exhaust manifold thereby to introduce the exhaust gases into said heating space;
- a change-over flap valve for controlling the exhaust gases introduced into said heating space in the vicinity of said heating portion, said change-over flap valve having a valve stem positioned within said extension;
- at least one fin disposed on said heating portion and extending therefrom into the space occupied by said change-over flap valve when in its open position, said fin having a cut-out portion which is shaped to form an abutment surface for the valve flap when the flap is in its open position; and
- a guide plate positioned in said exhaust manifold so as to guide said exhaust gases onto said heating portion;
- whereby when said flap valve is in its open position before the engine warm-up run, the exhaust gases from said engine impinge on said guide plate, circulate above and over said flap valve passing said fin and said heating portion to be heated thereby, and then into said exhaust manifold, and on the other hand, when said flap valve is in its closed position after the engine warm-up run, the exhaust gases from said engine are directly fed into said exhaust manifold.

* * * * *